US011370548B2

(12) United States Patent
Hough et al.

(10) Patent No.: US 11,370,548 B2
(45) Date of Patent: Jun. 28, 2022

(54) AFT COMPLEX GALLEY AND LAVATORY ARRANGEMENT

(71) Applicant: B/E Aerospace, Inc., Winston-Salem, NC (US)

(72) Inventors: Ray Hough, Great Denham (GB); Richard Morris, Pulloxhill (GB); Jefferey M. McKee, Duvall, WA (US); Shawn A. Claflin, Seattle, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 393 days.

(21) Appl. No.: 16/371,441

(22) Filed: Apr. 1, 2019

(65) Prior Publication Data

US 2019/0359336 A1 Nov. 28, 2019

Related U.S. Application Data

(60) Provisional application No. 62/665,975, filed on May 2, 2018.

(51) Int. Cl.
*B64D 11/02* (2006.01)
*B64D 11/00* (2006.01)
*B64D 11/04* (2006.01)

(52) U.S. Cl.
CPC .............. *B64D 11/02* (2013.01); *B64D 11/00* (2013.01); *B64D 11/0007* (2013.01);
(Continued)

(58) Field of Classification Search
CPC .. B64D 27/24; B64D 33/06; B64D 2027/026; B64D 11/02; B64D 11/04; B64D 11/06;
(Continued)

(56) References Cited

U.S. PATENT DOCUMENTS 9,114,878 B2 * 8/2015 Becker .................. B64D 11/04
9,359,076 B2 6/2016 Ivester et al.
(Continued)

FOREIGN PATENT DOCUMENTS

JP h10121754 A 5/1998

OTHER PUBLICATIONS

Mills, Dave, "11999 Crystal Skye Aft Galley (P4-XTL)", In Flickr (bulletin board online), Uploaded Aug. 18, 2017 (retrieved Jun. 13, 2019), Retrieved from the internet: <URL: https://www.flickr.com/photos/58327945@N07/35816567974/>.
(Continued)

*Primary Examiner* — Joshua J Michener
*Assistant Examiner* — Cindi M Curry
(74) *Attorney, Agent, or Firm* — Suiter Swantz pc llo (57) ABSTRACT

A modular aft galley and lavatory complex is disclosed. The galley complex is situated aft of an aircraft passenger cabin and incorporates left-side, right-side, and aft galley structures together partially enclosing an interior workspace, the left-side and right-side galley structures separated by a center aisle. Each galley structure includes trolley bays capable of securing trolleys therewithin. Each trolley can be removed from its trolley bay into the interior workspace or central aisle for use in catering or service operations inflight. Each galley structure includes storage bays accessible from the interior workspace. Between the upper and lower portions are flat workdecks and galley insert bays capable of accepting ovens, chillers, beverage makers, and other galley insert devices. Either the left or right galley structure includes a lavatory complex adjacent to the passenger cabin, incorporating aft lavatory units and a galley extension housing additional storage and cart space.

14 Claims, 7 Drawing Sheets

(52) U.S. Cl.
CPC ...... *B64D 11/0015* (2013.01); *B64D 11/0023* (2013.01); *B64D 11/04* (2013.01); *B64D 2011/0046* (2013.01)

(58) Field of Classification Search
CPC ....... B64C 27/08; B64C 27/20; B64C 11/001; B64C 11/44; B64C 25/04; B64C 25/06; B64C 25/34; B64C 25/36; B64C 13/04
See application file for complete search history.

(56) References Cited

U.S. PATENT DOCUMENTS

| | | | |
|---|---|---|---|
| 9,714,094 B2 | 7/2017 | Ivester et al. | |
| 9,862,491 B2 | 1/2018 | McKee et al. | |
| 10,232,942 B2 | 3/2019 | McKee | |
| 2009/0261200 A1* | 10/2009 | Saint-Jalmes | B64D 11/0691 244/118.5 |
| 2011/0101160 A1* | 5/2011 | Gomes | B64C 1/1423 244/118.5 |
| 2013/0001359 A1 | 1/2013 | Schliwa | |
| 2014/0048650 A1 | 2/2014 | Schliwa et al. | |
| 2014/0077033 A1 | 3/2014 | Scown et al. | |
| 2014/0125092 A1 | 5/2014 | Schreuder et al. | |
| 2014/0217239 A1 | 8/2014 | Ehlers et al. | |
| 2014/0224930 A1* | 8/2014 | Ivester | B64D 11/02 244/118.5 |
| 2014/0291446 A1 | 10/2014 | Reams et al. | |
| 2014/0339360 A1 | 11/2014 | Moje et al. | |
| 2014/0339363 A1 | 11/2014 | Moje et al. | |
| 2015/0007600 A1 | 1/2015 | Godecker et al. | |
| 2015/0069180 A1 | 3/2015 | Brunaux et al. | |
| 2015/0096118 A1 | 4/2015 | McIntosh | |
| 2015/0136903 A1 | 5/2015 | Schliwa | |
| 2015/0360782 A1* | 12/2015 | Jin | B64D 11/06 244/118.5 |
| 2016/0039522 A1 | 2/2016 | Koyama et al. | |
| 2016/0167784 A1 | 6/2016 | Schliwa | |
| 2017/0021929 A1 | 1/2017 | McKee et al. | |
| 2017/0283059 A1* | 10/2017 | McKee | B64D 11/003 |
| 2017/0320580 A1 | 11/2017 | Roth et al. | |
| 2017/0370630 A1 | 12/2017 | Klassen et al. | |
| 2018/0016008 A1 | 1/2018 | Payne et al. | |
| 2018/0208314 A1* | 7/2018 | Heidtmann | B64D 11/0007 |
| 2019/0308728 A1* | 10/2019 | McKee | B64D 11/00 |
| 2019/0359336 A1 | 11/2019 | Hough et al. | |

OTHER PUBLICATIONS

"777-200/300 Airplane Characteristics for Airport Planning", Manual (online), Boeing Company, May 2015 (retrieved Jun. 12, 2019). Retrieved from the internet: <URL: https://www.boeing.com/resources/boeingdotcom/commercial/airports/acaps/777_23.pdf>, Entire document, especially p. 29, 451 passengers.
Examination Report for European Application No. 19207505.9 dated Oct. 29, 2020, 4 pages.
International Search Report and Written Opinion dated Jul. 24, 2019 for PCT/US2019/029997.
Doyle, Christopher, "A321 Forward Attendant Station", In Wikimedia Commons (online), Jul. 12, 2008 17:12 (retrieved on Jun. 17, 2019), Retrieved from the internet.
International Search Report dated Jul. 31, 2019 for PCT/US2019/030002.
Extended Search Report in European Application No. 19795772.3 dated Jan. 21, 2022, 7 pages.

\* cited by examiner

AFT COMPLEX GALLEY AND LAVATORY ARRANGEMENT

CROSS-REFERENCE TO RELATED APPLICATIONS

The instant application claims priority under 35 U.S.C. § 119(e) to provisional U.S. Patent Application Ser. No. 62/665,975, filed May 2, 2018. The instant application is also related to concurrently filed and commonly owned U.S. patent application Ser. No. 16/371,468. Said U.S. Patent Application 62/665,975 and Ser. No. 16/371,468 are herein incorporated by reference in their entirety.

BACKGROUND

Widebody passenger aircraft may incorporate a main galley aft of the main passenger cabin. Additional galley space (e.g., for preparation or climate controlled storage of food and beverages) may be situated throughout the cabin. The main galley space may extend in a rough V-shape around the aft end of the passenger cabin. The galley complex may be oversized relative to auxiliary galley facilities, leading to excess traffic in the rear aisles associated with inflight catering and service operations. At the same time, said widebody aircraft may position passenger lavatories generally forward and amidships rather than aft of the cabin, encroaching upon the cabin space available for passenger seating. As this cabin space is both limited and highly valuable, lavatory arrangements may prioritize compactness above all. While the configuration of said lavatories may make efficient use of limited cabin space, they may not be optimal for use by passengers of reduced mobility (PRM) who may require additional space to comfortably enter, exit, or use the lavatory facilities.

SUMMARY

A modular aft galley and lavatory complex is disclosed. In embodiments, the galley complex is situated at the aft of a passenger cabin of an aircraft. The galley complex comprises left-side, right-side, and aft galley structures together partially enclosing an interior workspace, the left-side and right-side galley structures separated by a center aisle. Each individual galley structure individually or collectively includes trolley bays capable of securing trolleys (e.g., galley carts) therewithin; each trolley can be removed from its trolley bay into the interior workspace or central aisle for use in catering or service operations inflight. The galley structures include storage bays (sized to a standard unit container) accessible from the interior workspace. The galley structures further include flat worksurfaces (e.g., workdecks) and galley insert bays capable of accepting ovens, chillers, beverage makers, and other galley insert devices. Either the left-side or the right-side galley structure includes a lavatory complex adjacent to the passenger cabin. The lavatory complex includes individual lavatory units accessible from the passenger cabin as well as a galley extension housing additional storage and trolley space.

In embodiments, the galley extension includes additional storage bays.

In embodiments, some of the additional storage bays are accessible from the passenger cabin.

In embodiments, the galley extension includes a passenger self-service compartment stocked with refreshments and accessible from the center aisle or the passenger cabin.

In embodiments, the galley extension includes a fold-down deployable counter set into an exterior wall of the lavatory complex, the exterior wall facing the center aisle and the counter deployable across the center aisle.

In embodiments, the lavatory complex has an exterior wall facing into the interior galley workspace, and a deployable workdeck is set into the exterior wall, capable of folding down into the galley workspace to create a temporary work surface.

In embodiments, the lavatory complex includes dual lavatory units accessible through dual entry doors adjacent to each other.

In embodiments, the dual lavatory units are separated by one or more articulable panels capable of folding or retracting into an interior wall of the lavatory complex to create a single unified space.

In embodiments, one or both of the dual lavatory units is accessible to passengers of reduced mobility (e.g., by combining the two units into a single, larger space).

In embodiments, the galley insert devices include beverage makers, ovens, trash compactors, and refrigerators/chillers.

In embodiments, the galley complex includes cabin attendant seats mounted to an exterior wall of the galley complex opposite the lavatory complex and capable of folding down into the passenger cabin for temporary occupation by a crewmember.

In embodiments, the galley complex includes auxiliary storage within an exterior wall opposite the galley complex and accessible from the passenger cabin.

In embodiments, the center aisle is of sufficient width to accommodate the greatest of the length, the width, and the breadth of the trolley.

In embodiments, each galley structure comprises a lower portion closest to the floor of the passenger cabin and corresponding generally to the trolley bays; an upper portion closes to the ceiling of the passenger cabin and corresponding generally to the storage bays; and a middle portion between the upper portion and the lower portion, the middle portion corresponding generally to the horizontal worksurfaces and galley insert bays.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A galley and lavatory complex is disclosed. The galley and lavatory complex may be situated aft of the passenger cabin and incorporate lavatory facilities aft of the rearmost passenger egress door. Cabin space may be preserved for seating by incorporating lavatory facilities into the galley complex while maintaining a large central workspace optimal for inflight catering operations as well as passenger self-service. In addition, lavatory facilities may be made more accessible and comfortable for passengers with reduced mobility.

Figure 1:
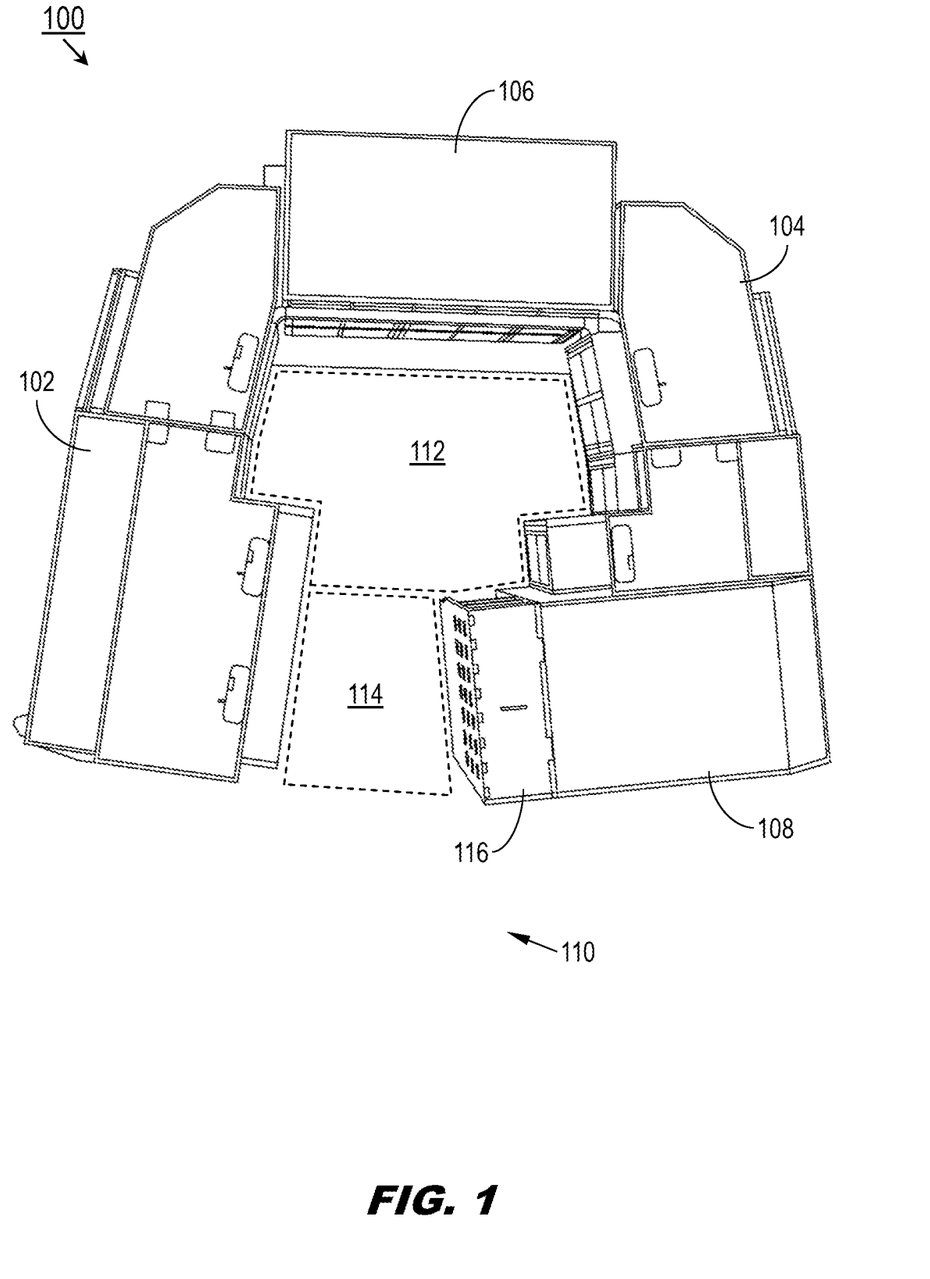
FIG. 1 is an overhead view illustrating a modular aft galley/lavatory complex in accordance with example embodiments of this disclosure.

Referring to FIG. 1, a modular aft galley/lavatory complex 100 for an aircraft in accordance with example embodiments of this disclosure may include a group of interconnected galley structures, e.g., a left-side galley structure 102, a right-side galley structure 104, and an aft galley structure 106 connecting the left-side and right-side galley structures. The right-side galley structure 104 may incorporate a lavatory complex 108 accessible from the aircraft passenger cabin 110. In some embodiments, the lavatory complex 108 may be incorporated into the left-side galley structure 102 (e.g., relative to the aft galley/lavatory complex 100).

In embodiments, the aft galley/lavatory complex 100 may be situated at the aft terminus of the passenger cabin 110, such that the left-side galley structure 102 (e.g., relative to the aft galley/lavatory complex 100) extends substantially forward along the starboard side of the aircraft and the right-side galley structure 104 extends substantially forward along the port side. Accordingly, the aft galley/lavatory complex 100 may be situated aft of the rearmost passenger egress door.

In embodiments, the aft galley/lavatory complex 100 may be connected to onboard supplies of electrical power and potable water as well as onboard communications or computing networks. Similarly, the aft galley/lavatory complex 100 may be connected to vacuum lines, pipes, or ducting systems, e.g., for draining waste water from sinks and toilets, ventilating the lavatory complex 108, or removing under suction solid and liquid waste products from the lavatory complex for secure and sanitary inflight storage.

The aft galley/lavatory complex 100 may include an interior galley workspace 112 partially enclosed by the left-side galley structures 102, the right-side galley structures 104, and the aft galley structures 106. For example, crewmembers may access the galley workspace 112 from the passenger cabin 110 via a central aisle 114. From the galley workspace 112, crewmembers may use or access storage spaces, worksurfaces, galley inserts, and trolleys situated within the galley structures. In embodiments, the lavatory complex 108 may include a galley extension 116 providing additional storage space.

Figure 2A:
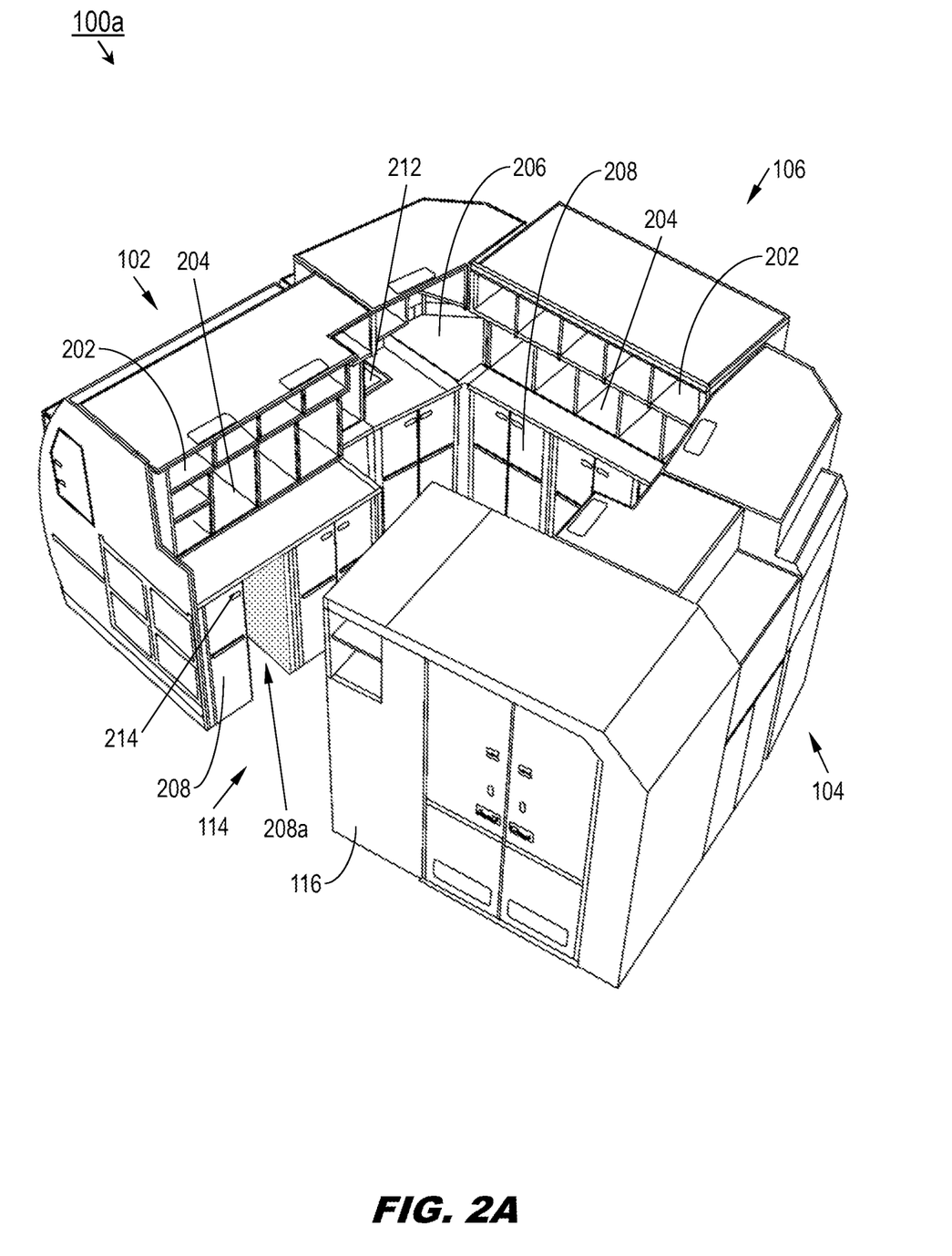
FIGS. 2A and 2B are respectively forward isometric and forward views of the aft galley/lavatory complex of FIG. 1.
Figure 2B:
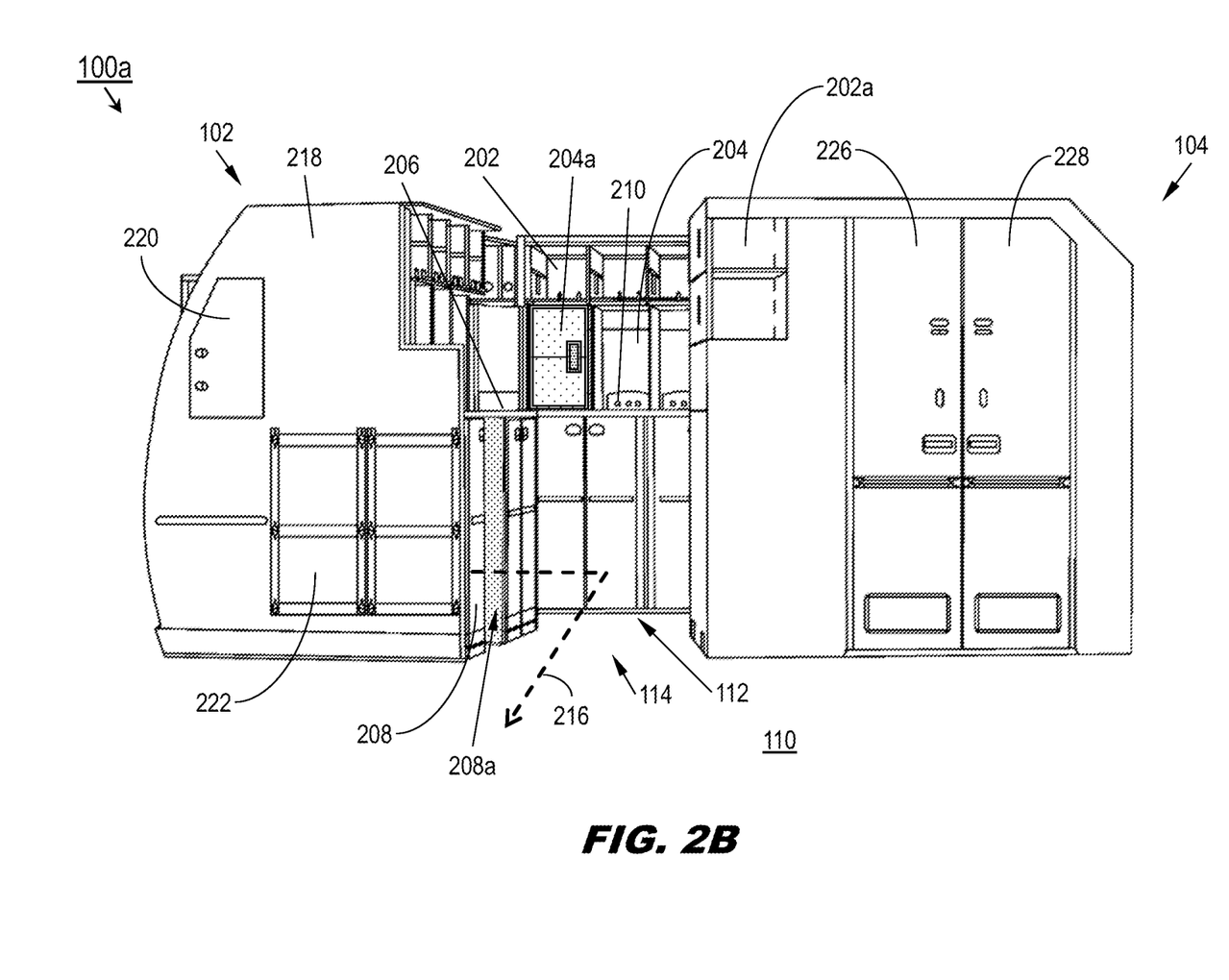

Referring now to FIGS. 2A and 2B, the aft galley/lavatory complex 100a may be implemented and may function similarly to the aft galley/lavatory complex 100 of FIG. 1, except that the aft galley/lavatory complex 100a may incorporate storage bays 202, galley insert bays 204, workdecks 206, trolleys 208, and trolley bays 208a into the left-side galley structures 102, the right-side galley structures 104, and the aft galley structures 106 and accessible via the interior galley workspace 112 and the central aisle 114.

For example, the storage bays 202 may define a top portion of the aft galley/lavatory complex 100a, being situated above other components of the aft galley/lavatory complex. In embodiments, each storage bay 202 may be sized to fit a galley standard unit container. Below the topmost level of storage bays 202, the aft galley/lavatory complex 108 may incorporate galley insert bays 204 into which galley insert devices 204a may be inserted or installed. For example, galley insert devices 204a may include, but are not limited to, conventional ovens, steam ovens or warmers, microwave ovens, beverage makers (e.g., devices for heating water or making coffee, tea, espresso, cappuccino, and other heated drinks), trash compactors, refrigerators, and chillers.

In embodiments, each galley insert bay 204 may include a galley insert interface 210 to which a galley insert device 204a may connect. For example, via the galley insert interface 210 a galley insert device 204a may submit diagnostic or usage information to an aircraft-based network or controller device, or communicate power requests to a galley-wide power and control unit which in turn may supply operating power to the galley insert device through the galley insert interface according to its priority. In embodiments, sinks 212 or other galley insert devices may be directly incorporated into the galley structures, draining through waste water lines incorporated into the galley structure.

In embodiments, workdecks 206 may be flat, substantially horizontal work surfaces for food preparation, positioned at approximate waist level. Beneath the workdecks 206, and generally defining the lower level of the aft galley/lavatory complex, the aft galley/lavatory complex 100*a* may incorporate a series of trolley bays 208*a*, each trolley bay sized to securely accommodate a trolley 208 (e.g., galley cart). In some embodiments, the aft galley/lavatory complex 100*a* may include internal ducting and a fan/chiller device capable of circulating chilled air throughout some or all of the trolley bays in order to maintain the trolleys 208 therein at a sufficiently cold temperature. Each trolley 208 may have a forward handle 214 via which the trolley may be released from its bay 208*a* (e.g., via single-hand operation) and drawn therefrom into the galley workspace 112 or the central aisle 114 for transport along an aisle of the passenger cabin 110 (e.g., via wheels mounted to the underside of the cart) for catering or service operations. In embodiments, the central aisle 114 may be of the minimum width possible to accommodate the longest dimension (e.g., the lengthwise dimension) of a trolley 208, such that a trolley adjacent to the central aisle may be easily removed from (216), or returned to, its trolley bay 208*a*.

In embodiments, the forward end 218 of the left-side galley structure 102 may incorporate an emergency storage compartment 220 and one or more cabin attendant seats 222 facing the passenger cabin 110; the cabin attendant seats 222 may be folded down for temporary belted accommodation of a cabin crewmember (e.g., during takeoff and landing operations). Similarly, the forward end 224 of the lavatory complex 108 may incorporate entry doors 226, 228 via which the lavatory units of the lavatory complex may be accessed. In embodiments, the galley extension 116 may include additional storage bays (202, FIG. 4) and a trolley bay (208*a*, FIG. 4) accessible from the galley workspace or one or more storage bays 202*a* set into the forward end 224 and accessible from the passenger cabin 110.

Figure 3A:
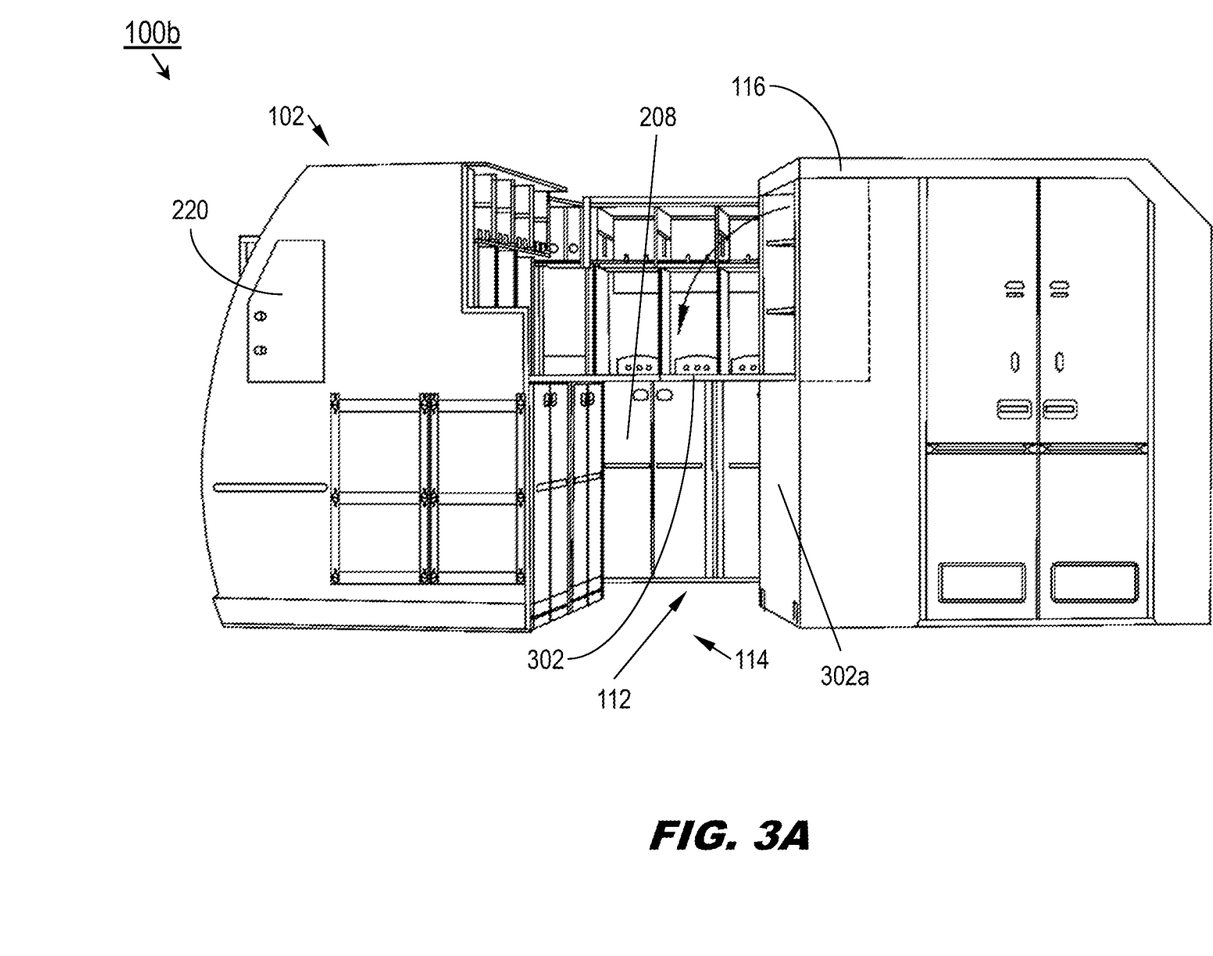
FIGS. 3A and 3B are forward views of the aft galley/lavatory complex of FIG. 1.
Figure 3B:
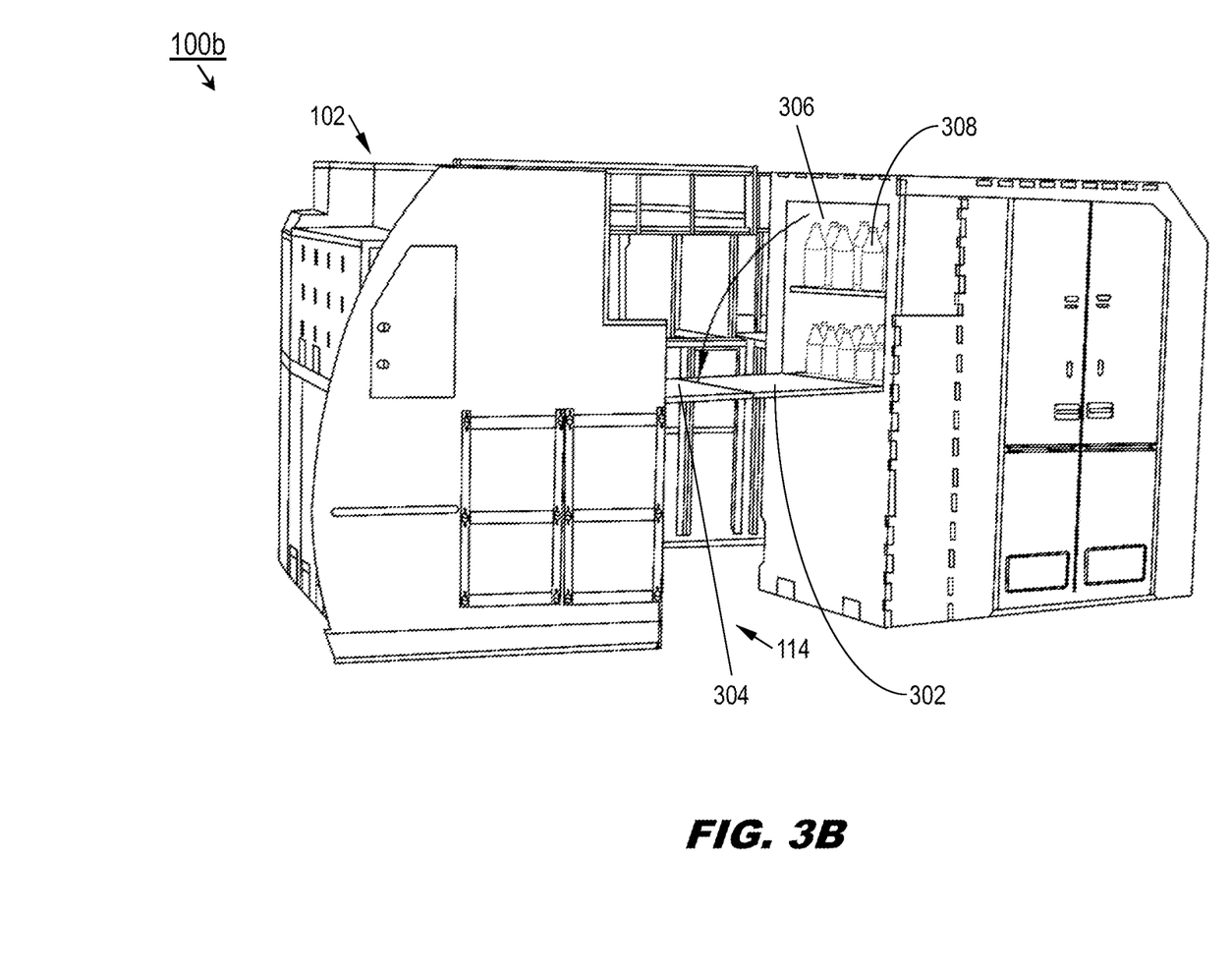

Referring now to FIGS. 3A and 3B, the aft galley/lavatory complex 100*b* may be implemented and may function similarly to the aft galley/lavatory complex 100*a* of FIGS. 2A and 2B, except that the galley extension 116 of the aft galley/lavatory complex 100*b* may incorporate a deployable counter 302. For example, the deployable counter 302 may fold downward from an exterior wall 302*a* into the central aisle 114 to create a temporary surface across the central aisle. The deployable counter 302 may serve as a barrier extending across the central aisle 114 to prevent unauthorized access to the galley workspace 112; at the same time, cabin crew within the galley workspace 112 may utilize the deployable counter 302 for inflight service of food or drinks to passengers. In embodiments, the deployable counter 302 may deploy across the central aisle 114 at a sufficient height to permit trolleys 208 to pass unobstructed into and out of the aft galley/lavatory complex 100*b*.

The deployable counter 302 may extend fully or partially across the central aisle 114. Referring in particular to FIG. 3B, in embodiments where the deployable counter 302 extends partially across the central aisle 114, an auxiliary counter 304 may deploy from the opposite side of the central aisle (e.g., the left-side galley structure 102) to connect with the deployable counter. In some embodiments, the galley extension 116 may include a self-service compartment 306 which may be set into the galley extension facing the central aisle 114 or revealed by the deployment of the deployable counter 302. For example, the self-service compartment 306 may be stocked with refreshments 308 displayed behind one or more transparent panels or doors, the refreshments accessible to passengers visiting the aft galley/lavatory complex 100*b* (e.g., when passengers are able to move freely about the cabin). In some embodiments, the self-service compartment 306 may be climate controlled or equipped with a chiller device capable of maintaining its contents at a desired temperature.

Figure 4:
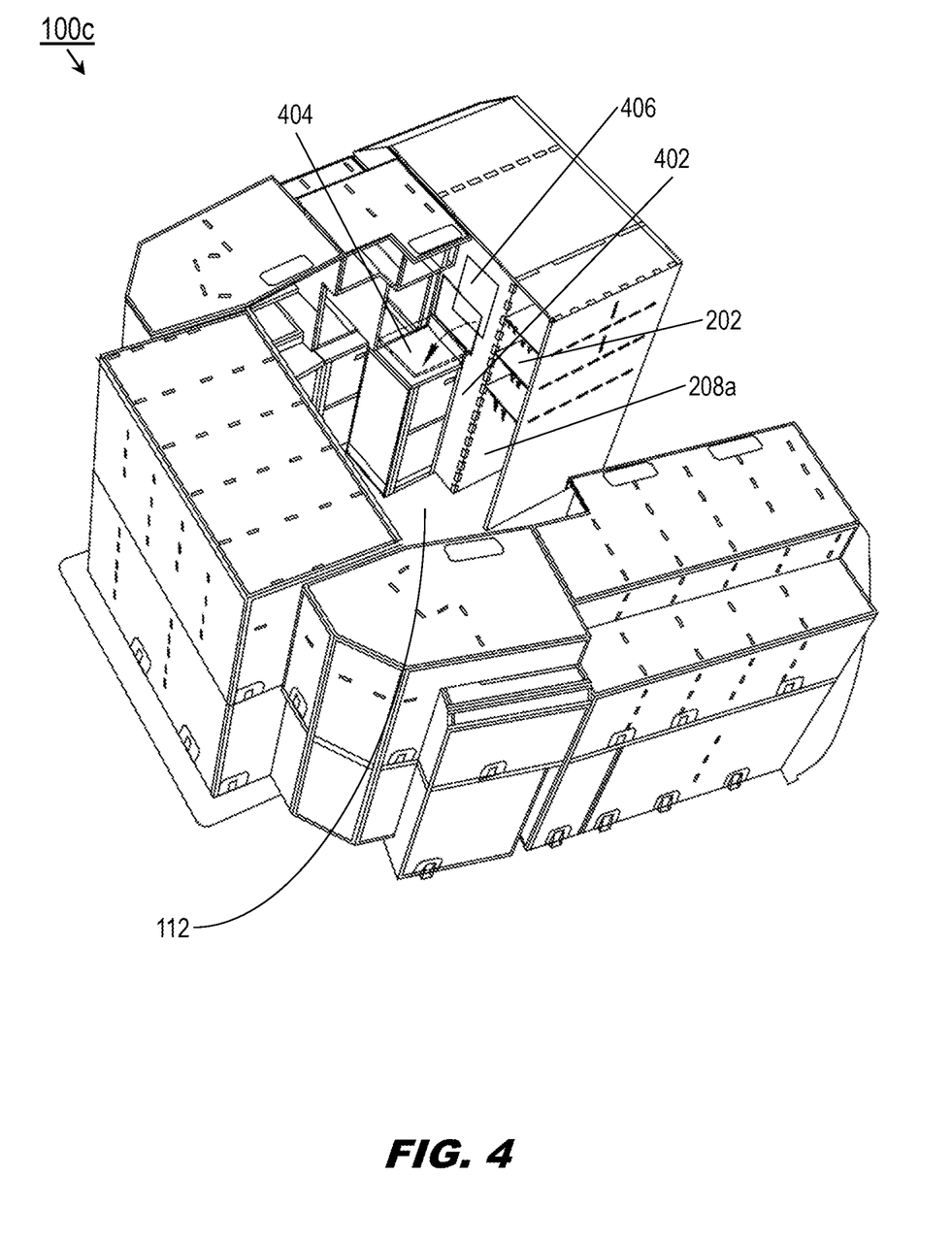
FIG. 4 is an aft isometric view of the aft galley/lavatory complex of FIG. 1.

Referring to FIG. 4, the aft galley/lavatory complex 100*c* may be implemented and may function similarly to the aft galley/lavatory complex 100*b* of FIGS. 3A and 3B, except that the aft galley/lavatory complex 100*c* may utilize the aft facing surface 402 (e.g., aft exterior surface of the lavatory complex, facing into the galley workspace 112) of the lavatory complex 108. For example, the aft facing surface 402 may include an auxiliary workdeck 404 capable of folding downward into the galley workspace 112 to provide an additional or enlarged work surface for cabin crew.

In some embodiments, the aft facing surface 402 may include a monitoring panel 406 for use by cabin crew within the galley workspace 112 (and who might not otherwise have a direct view of the passenger cabin 110). For example, the monitoring panel 406 may incorporate one or more of, e.g., a cabin video monitoring system (CVMS); a wall-mounted emergency light (WMEL) an interactive flight attendant panel (FAP); a remote control center (RCC); an inflight entertainment (IFE) compatible display (e.g., a liquid crystal display (LCD)); and a communications station/loudspeaker.

Figure 5:
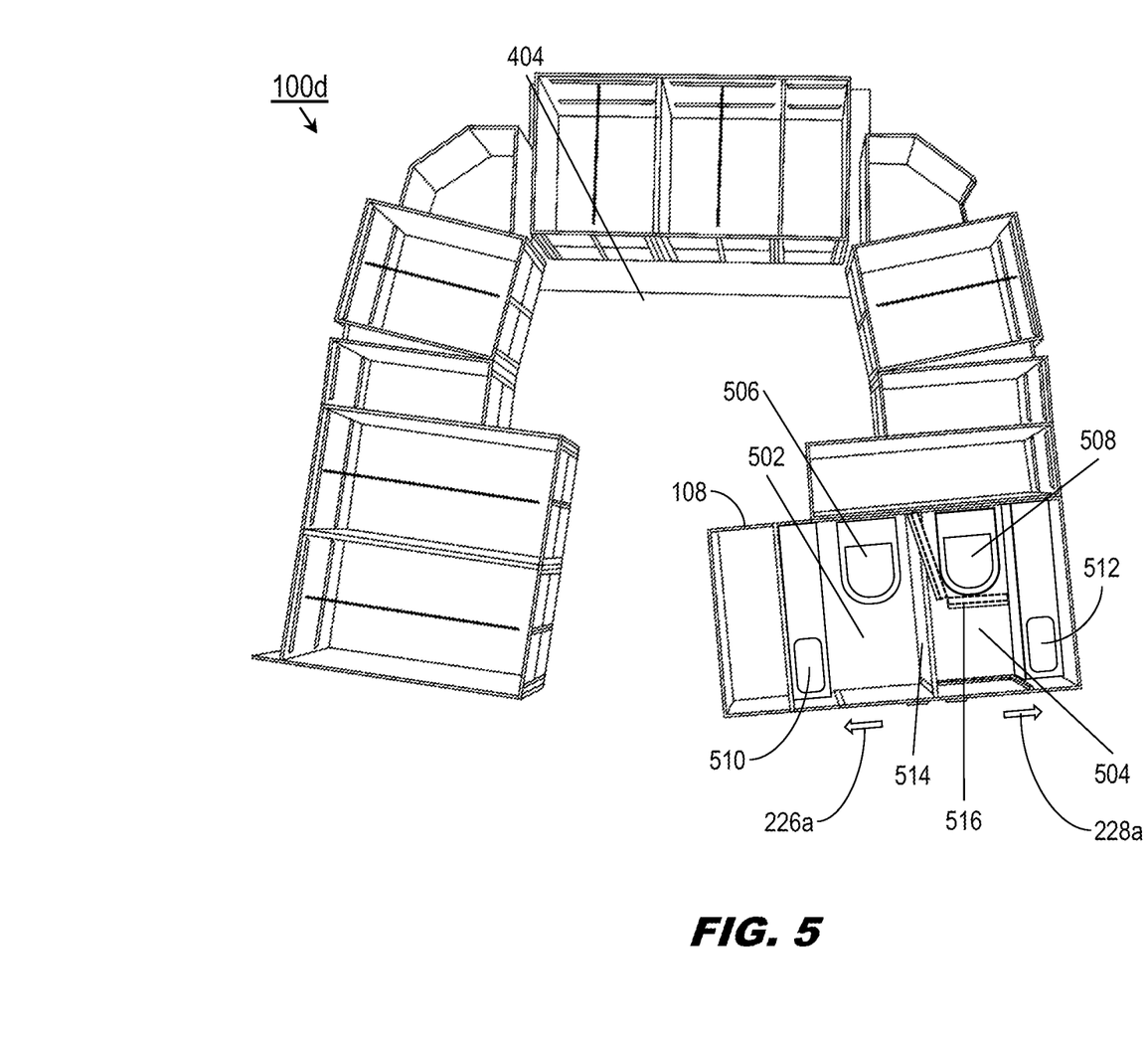
FIG. 5 is an overhead structural view of the aft galley/lavatory complex of FIG. 1.

Referring now to FIG. 5, the aft galley/lavatory complex 100*d* may be implemented and may function similarly to the aft galley/lavatory complex 100*c* of FIG. 4, except that the lavatory complex 108 of the aft galley/lavatory complex 100*d* may incorporate dual lavatory units 502, 504 respectively accessible via entry doors 226, 228 set into the forward end 224 of the lavatory complex 108. In embodiments, the entry doors 226, 228 may open into the passenger cabin 110 in opposing directions (226*a*, 228*a*).

Each individual lavatory unit 502, 504 may be designed for use by a single occupant and incorporate a toilet (506, 508) and sink (510, 512) in addition to ventilation and lighting fixtures. In embodiments, the individual lavatory units 502, 504 may be temporarily combined into a larger interior space to enhance accessibility for passengers of reduced mobility (PRM). For example, the individual lavatory units 502, 504 may be separated by a partition 514 capable of partially or fully retracting (516) into either individual lavatory unit 502, 504 of the lavatory complex 108 to enlarge the size of the individual lavatory unit 502. Temporary enlargement of the individual lavatory unit 502 in this way may provide more maneuvering room for passengers using wheelchairs or other assistive equipment and who may consequently have difficulty using a standard-size lavatory. Similarly, the entry doors 226, 228 may open in opposing directions 226*a*, 228*a* to facilitate entry and egress into and from the enlarged individual lavatory unit 502.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft galley complex, comprising:
 a plurality of galley structures installable in an aft portion of a passenger cabin of an aircraft, the plurality of galley structures together partially enclosing a galley workspace accessible through a central aisle, the galley workspace broader than the central aisle, the plurality of galley structures comprising a left-side galley structure and a right-side galley structure separated by the central aisle and coupled to an aft galley structure, each galley structure comprising:
  1) a plurality of first trolley bays, each first trolley bay capable of securing a trolley removable from the first trolley bay into the galley workspace;
  2) a plurality of storage bays accessible from the galley workspace;
  3) at least one substantially horizontal worksurface; and
  4) at least one galley insert bay capable of housing a galley insert;
 and
 a lavatory complex coupled to one of the left-side galley structure and the right-side galley structure, the lavatory complex comprising:
  at least two adjacent lavatory units accessible from the passenger cabin;
  and
  a galley extension attached to at least one of the adjacent lavatory units and extending therefrom into the central aisle, the galley extension including at least one second trolley bay capable of removably securing the trolley.

2. The aircraft galley complex of claim 1, wherein the plurality of storage bays are first storage bays and the galley extension further comprises at least one second storage bay.

3. The aircraft galley complex of claim 2, wherein the at least one second storage bay includes at least one second storage bay accessible from the passenger cabin.

4. The aircraft galley complex of claim 1, wherein the galley extension further comprises:
 at least one self-service compartment situated above the second trolley bay, the self-service compartment accessible from at least one of the central aisle and the passenger cabin.

5. The aircraft galley complex of claim 1, wherein the galley extension comprises:
 an exterior wall facing the central aisle;
 and
 at least one counter set into the exterior wall and capable of unfolding across the central aisle into a horizontal position.

6. The aircraft galley complex of claim 1, wherein the lavatory complex further comprises:
 an aft facing surface facing the galley workspace;
 and
 at least one auxiliary workdeck set into the aft facing surface and capable of unfolding into the galley workspace in the horizontal position.

7. The aircraft galley complex of claim 1, wherein the at least two adjacent lavatory units include a left-side lavatory unit accessible via a left-side door and a right-side lavatory unit accessible via a right-side door adjacent to the left-side door.

8. The aircraft galley complex of claim 7, wherein the left-side lavatory unit and the right-side lavatory unit are separated by at least one partition configured for enlarging either the left-side lavatory unit or the right-side lavatory unit into a single space by folding into the other lavatory unit.

9. The aircraft galley complex of claim 8, wherein the enlarged left-side lavatory unit or the enlarged right-side lavatory unit is accessible by a passenger with reduced mobility (PRM).

10. The aircraft galley complex of claim 1, wherein the at least one galley insert includes at least one of a beverage maker, an oven, a trash compactor, and a refrigerator.

11. The aircraft galley complex of claim 1, further comprising:
 at least one cabin attendant seat coupled to the plurality of galley structures opposite the lavatory complex and accessible from the passenger cabin, the cabin attendant seat configured to fold down for temporary accommodation of an occupant.

12. The aircraft galley complex of claim 1, further comprising:
 at least one emergency storage compartment coupled to the plurality of galley structures opposite the lavatory complex, the emergency storage compartment accessible from the passenger cabin.

13. The aircraft galley complex of claim 1, wherein:
 the trolley is associated with a breadth, a height, and a depth;
 and
 the central aisle is associated with a width, the width greater than the largest of the breadth, the height, and the depth.

14. The aircraft galley complex of claim 1, wherein each galley structure comprises:
 a lower portion adjacent to a floor of the passenger cabin, the lower portion corresponding to the plurality of first trolley bays;
 an upper portion corresponding to the plurality of storage bays;
 and
 a middle portion between the upper portion and the lower portion, the middle portion corresponding to the substantially horizontal worksurface and the at least one galley insert bay.

* * * * *